(12) United States Patent
Paul et al.

(10) Patent No.: US 10,036,455 B2
(45) Date of Patent: Jul. 31, 2018

(54) CAMSHAFT AND METHOD FOR PRODUCING THE CAMSHAFT

(75) Inventors: Daniel Paul, Burkhardtsdorf (DE); Robert Reichelt, Frankenberg (DE)

(73) Assignee: ThyssenKrupp Presta TecCenter AG, Eschen (DE)

( * ) Notice: Subject to any disclaimer, the term of this patent is extended or adjusted under 35 U.S.C. 154(b) by 0 days.

(21) Appl. No.: 14/124,882

(22) PCT Filed: Mar. 20, 2012

(86) PCT No.: PCT/EP2012/054892
§ 371 (c)(1),
(2), (4) Date: Feb. 4, 2014

(87) PCT Pub. No.: WO2012/167962
PCT Pub. Date: Dec. 13, 2012

(65) Prior Publication Data
US 2014/0174248 A1    Jun. 26, 2014

(30) Foreign Application Priority Data
Jun. 8, 2011  (DE) .......... 10 2011 050 930

(51) Int. Cl.
  F16H 53/00 (2006.01)
  B21D 53/84 (2006.01)
  F16H 25/14 (2006.01)

(52) U.S. Cl.
  CPC .......... *F16H 25/14* (2013.01); *B21D 53/845* (2013.01); *Y10T 29/49293* (2015.01); *Y10T 74/2101* (2015.01)

(58) Field of Classification Search
  CPC ........ F16H 53/025; F16H 53/04; F16H 25/14; F01L 1/047; F01L 2001/0471; Y10T 74/2101; Y10T 29/49293; B21D 53/845
  USPC ............. 74/567, 568 R; 123/90.17; 29/888.1
  See application file for complete search history.

(56) References Cited

U.S. PATENT DOCUMENTS

| | | |
|---|---|---|
| 2,892,254 A | 6/1959 | Garvin |
| 4,620,454 A | 11/1986 | Sugiuchi et al. |
| 4,781,076 A * | 11/1988 | Hartnett et al. ................. 74/567 |
| 4,835,832 A * | 6/1989 | Arnold .................... F01L 1/047 29/445 |
| 4,875,270 A | 10/1989 | Krips et al. |

(Continued)

FOREIGN PATENT DOCUMENTS

| | | |
|---|---|---|
| DE | 3704092 C1 | 5/1988 |
| DE | 10150092 C1 | 4/2003 |

(Continued)

*Primary Examiner* — Adam D Rogers
(74) *Attorney, Agent, or Firm* — Laurence A. Greenberg; Werner H. Stemer; Ralph E. Locher

(57) ABSTRACT

A camshaft contains a support tube, on which components including at least one cam are arranged at predetermined locations. The support tube extends at least partially through a hole in the components, and wherein a press fit is produced between the support tube and the components by hydroforming. Accordingly, at least one locally formed material formation is provided between the support tube and the hole. Via the material formation, the component is retained at the location in a desired orientation relative to the support tube in such a way that the support tube having the mounted components can be fed for hydroforming.

9 Claims, 2 Drawing Sheets

(56) References Cited

U.S. PATENT DOCUMENTS

| | | | | |
|---|---|---|---|---|
| 4,882,825 A * | 11/1989 | Nakamura | | 29/888.1 |
| 5,052,845 A | 10/1991 | Maus et al. | | |
| 5,101,554 A * | 4/1992 | Breuer | | B21D 39/04 |
| | | | | 29/421.1 |
| 5,272,930 A * | 12/1993 | Nakamura et al. | | 74/434 |
| 5,280,675 A * | 1/1994 | Orsini, Jr. | | 29/888.1 |
| 5,299,881 A | 4/1994 | Mettler-Friedli | | |
| 5,428,894 A * | 7/1995 | Orsini, Jr. | | 29/888.1 |
| 7,484,296 B2 * | 2/2009 | Merz | | B23P 11/00 |
| | | | | 123/90.6 |
| 7,574,889 B2 | 8/2009 | Furchheim | | |
| 8,844,130 B2 * | 9/2014 | Scherzinger | | B23P 11/00 |
| | | | | 123/90.16 |
| 2006/0064872 A1 * | 3/2006 | Shirai | | B21D 53/84 |
| | | | | 29/888.1 |
| 2008/0222889 A1 | 9/2008 | Asbeck et al. | | |
| 2008/0250895 A1 * | 10/2008 | Yamamoto | | B23P 11/025 |
| | | | | 74/567 |
| 2009/0137327 A1 * | 5/2009 | Waseda | | B21D 53/845 |
| | | | | 464/183 |
| 2010/0058888 A1 * | 3/2010 | Mueller | | B21D 53/845 |
| | | | | 74/567 |
| 2010/0224146 A1 * | 9/2010 | Kuwahara | | B22F 7/062 |
| | | | | 123/90.6 |
| 2014/0223736 A1 * | 8/2014 | Kim et al. | | 29/888.1 |

FOREIGN PATENT DOCUMENTS

| | | |
|---|---|---|
| DE | 102343368 C1 | 9/2003 |
| DE | 102006001769 A1 | 7/2007 |
| DE | 102007036629 B3 | 7/2008 |
| DE | 102007012756 A1 | 9/2008 |
| EP | 0257175 A1 | 3/1988 |
| GB | 1117816 A * | 6/1968 |
| WO | 9202739 A1 | 2/1992 |
| WO | WO 2015086157 A1 * | 6/2015 ............... F01L 1/047 |

* cited by examiner

CAMSHAFT AND METHOD FOR PRODUCING THE CAMSHAFT

BACKGROUND OF THE INVENTION

Field of the Invention

The present invention relates to a camshaft having a support tube, on which components comprising at least one cam are arranged in predetermined seat positions, wherein the support tube at least partially extends through a hole in the components and wherein an interference fit assembly between the support tube and the components is created by means of internal high-pressure forming.

DE 10 2007 012 756 A1 proposes a method for producing a generic camshaft having a support tube, on which components such as cams, bearing races, end pieces, pulse generator cams, camshaft adjusters, drive pinions and the like are arranged in predetermined seat positions. The production of camshafts requires high dimensional and positional accuracies of the components on the support tube. The accuracies are required both axially in longitudinal direction of the support tube as well as in the orientation of the angular position of the components about the axis of rotation of the support tube. For orientating the components it is proposed to use jaws, which are introduced in the forming tool. Following this, internal high-pressure forming can be used according to a first proposed version in order to plastically deform the support tube. By doing so, an interference fit assembly between the support tube and the components is created and components can be provided whose functional surfaces have finished functional surfaces even prior to the establishing of the interference fit assembly.

Disadvantageously, the construction of the forming tool with a plurality of jaws is elaborate and there is no advantageous possibility of positioning the components in axial direction of the support tube.

In DE 101 50 092 C1 a further method for producing a generic camshaft is shown, and the support tube, preassembled with the components, is placed into a tool lower part, wherein the positioning of the components and of the support tube is provided position and function-appropriately. The exact position of the components is created through clamping and/or sucking the components through the tool lower part with vacuum.

The necessary positioning of the components relative to the support tube thus causes substantial design efforts for the configuration of the forming tool and the provision of the components with already finished function surfaces prior to producing the interference fit assembly between the support tube and the components is only conditionally possible. Frequently, cutting process reworking of the function surfaces of the components is necessary, as a result of which in turn a highly precise positioning of the components on the support tube seems superfluous, since with a cutting process finishing of the function surfaces of the components, shape and position deviations can be offset anyhow.

BRIEF SUMMARY OF THE INVENTION

It is therefore the object of the present invention to create a camshaft and a method for producing the camshaft, with which the disadvantages of the prior art are overcome and which makes possible a simplified production.

The invention includes the technical teaching that between the support tube and the hole at least one locally formed material moulding is provided, through which the component in the seat position is held in a desired orientation relative to the support tube in such a manner that the support tube with the placed components is feedable to the internal high-pressure forming.

The invention starts out from the idea of embodying the camshaft in such a manner that the components on the support tube can assume a position which is highly accurate at least in longitudinal direction of the support tube even prior to the feeding to the internal high-pressure forming. Through the locally formed material moulding between the support tube and the hole in the component, the component can be arranged on the support tube in a self-holding manner and the position of the component can already have the final position at least in longitudinal direction of the support tube. When the support tube with the components is subsequently placed into the internal high-pressure forming tool, the internal high-pressure forming process can be effected through a plastic expansion of the support tube while the axial position and the angular position of the components relative to the support tube is maintained.

The material moulding can be introduced in the outer surface of the support tube and/or in the inner surface of the hole in the component. With particular advantage, the material moulding can be provided however in the outer surface of the support tube, since introducing the material moulding in an outer surface can be carried out more easily from a tool point of view. The invention in principle provides that the hole is a larger diameter than the outer diameter of the support tube prior to the internal high-pressure forming. Only through the material moulding can an at least non-positive connection between the support tube and the components be created, wherein the material mouldings can cause a plastic deformation in the mating surface, i.e. either in the inner surface of the hole or in the outer surface of the support tube, which the material moulding adjoins, can cause a plastic deformation, so that through the material moulding an at least partial positive connection is also created. In principle it is also possible to provide material mouldings both in the outer surface of the support tube as well as additionally on the inner surface of the hole. Material mouldings in the hole of the component however have the disadvantage that the component has to be pushed with the material moulding in the hole over and beyond said hole over a large part of the length of the support tube.

According to an advantageous embodiment of the invention for introducing the material moulding in the outer surface of the support tube, if appropriate also in the inner surface of the hole, knurling can be employed. Knurling describes a plastic deformation of a work piece surface by means of a knurling tool, wherein a texture of the knurling tool is formed in the surface of the work piece, namely in the outer surface of the support tube or in the inner surface of the hole. The knurling tool can be formed in such a manner that the material moulding is introduced in the outer surface of the seat position of the support tube and substantially extends in longitudinal direction of the support tube. The material moulding however can also have dimensions through the knurling which for example are the same in longitudinal direction of the support tube and in circumferential direction, for example round or rectangular, in particular square material mouldings. Preferably, the material moulding is embodied in an elongated manner and extends in longitudinal direction of the support tube with a length, which for example can correspond to the width of the component, or the length of the material moulding for example corresponds to the width of the seat position.

The support tube can comprise one, preferably two and most preferred three material mouldings on a seat position, which material mouldings are in particular introduced in the outer surface evenly distributed over the circumference of the support tube. In the same way, one, two or preferably three material mouldings can likewise be introduced in the inner surface of the hole in the component in order to achieve the same effect of arranging the component on the support tube in a prepositioned self-holding manner.

Thereby it is not preferably provided to arrange the component on the support tube through the material moulding in such a manner that a state of the camshaft that is ready for operation is already achieved by doing so. In principle, the material moulding is to merely serve for the prepositioning of the component in the correct position on the support tube in order to subsequently create a plastic expansion of the support tube through an internal high-pressure forming method. Only through the plastic expansion is the radial gap between the support tube and the hole in the component bridged and the support tube is subjected to a plastic expansion at least in the seat positions which is so great that the interference fit assembly between the component and the support tube is created under simultaneous elastic expansion. The regions of the support tube between the seat positions for arranging the components in this case can be subjected to an even greater plastic forming so that the remaining diameter of the support tube between the seat positions is greater than the diameter of the support tube at the location of the seat positions.

The material moulding can have a height of 0.1 mm to approximately 1 mm, preferably of 0.2 mm to approximately 0.7 mm and most preferred of approximately 0.5 mm and can for example be also soldered on or welded on as filler material.

It can also be formed as a plastic moulding. In particular when the hole in the component is in a state as forged, the bore can have a radial dimensional tolerance of approximately 0.3 mm. Consequently, the tolerance of the forged cam has to be offset with the material moulding in order to always obtain a secure pressing between the support tube and the component. The height of the material moulding can consequently be determined in such a manner that taking into account the tolerance width an overlap of at least 0.1 mm is created, which has to be elastically and plastically displaced in order to be able to arrange the component on the support tube with a required minimum holding force. In particular the forces which can act on the components on the support tube during a transport, for example to the internal high-pressure forming is under way, have to be securely held on the support tube through the pressing of the component.

In order to create a secure pressing between the support tube and the component, the cross-sectional shapes of the material mouldings can be formed in the manner of a triangle, trapezium or truncated cone.

The object of the present invention is additionally solved through a method for producing a camshaft with a support tube, on which at least one component, comprising at least one cam, is arranged in a predetermined seat position, wherein at least the steps of the providing of the support tube and of the at least one component, of the introducing of at least one material moulding in the outer surface of the support tube in the region of a seat position or in a hole of the component, which is introduced in the component for receiving the component on the support tube, of the prepositioning in a rotationally fixed manner of the component in the seat position by forming an at least non-positive connection of the component with the support tube in the region of the material moulding, the creating of an interference fit assembly between the support tube and the component by means of internal high-pressure forming subject to forming a required connection strength between the component and the support tube are provided.

Advantageously, the support tube can at least partially extend through a hole in the components. For example, the component can be formed by an end piece, which just like the cams is to be arranged on the support tube. The hole in the end piece however is not a through-hole, but the support tube merely extends some way into the hole in the end piece. Prepositioning of the end piece by means of at least one material moulding between the support tube and the hole in the end piece can be effected in the same way as the prepositioning of the cam and/or of a bearing race.

With particular advantage, the material moulding can be introduced in the outer surface of the support tube and/or in the hole through a knurling method. For example, a knurling tool in the form of a knurling roller can be provided, which during the knurling process can roll off against the support tube. In the knurling roller, at least one depression can be located and when the support tube rolls off against the knurling roller and with sufficiently high contact pressure, a plastic deformation in the material of the support tube is created, and the material of the support tube can be pressed into the depression in the knurling roller. As a result, a material moulding on the outer surface of the support tube is formed so that because of this the support tube locally has a larger diameter and through which the desired prepositioning of the component on the support tube can be created.

Further advantageously, the component can be a forging and be placed on the support tube in a state as forged, in particular, the hole of the component can have a state as forged when the component is placed on the support tube. Here, the state as forged describes a surface of the component and in particular of the hole which after the production of the component by forging has not been reworked for example in a cutting process manner.

According to an advantageous further development of the method, the component can comprise a function surface, which following the creation of the interference fit assembly between the support tube and the component by means of the internal high-pressure forming is worked through a cutting process method, in particular finish-worked. The function surface can for example be the cam running surface of the cam or the bearing running surface of the bearing race. By doing to it is achieved that the radial position of the component on the support tube before and during the internal high-pressure forming method can remain uncontrolled at least through additional means, even when the radial prepositioning and maintaining of this position in the internal high-pressure tool is already substantial, since the component has a grinding allowance for the finish-working, but which however should be minimal. However, the radial position of the component in the internal high-pressure tool based on the present invention need not be held in a highly accurate manner, and the radial orientation of the function surface is only created through a cutting finish-working of the component, for example through grinding. Consequently, an at least axial orientation of the components on the support tube is achieved through the prepositioning of the components on the support tube by means of the material mouldings according to the invention, which remains intact over the entire course of the production, and a simplification of the production up to the cutting finish-working can be achieved.

Advantageously, the angular position of the component relative to the support tube can also be already finally determined through the prepositioning.

With the internal high-pressure forming for creating the interference fit assembly between the support tube and the component, at least one bearing position in the support tube can furthermore be created through plastic forming. A combination method can thereby be made possible in order to create both a radial expansion of the support tube for press-fitting the components on the support tube as well as forming at least one bearing position out of the material of the support tube itself.

Further measures improving the invention are shown in more detail in the following jointly with the description of a preferred embodiment of the invention.

DESCRIPTION OF THE INVENTION

Figure 1:
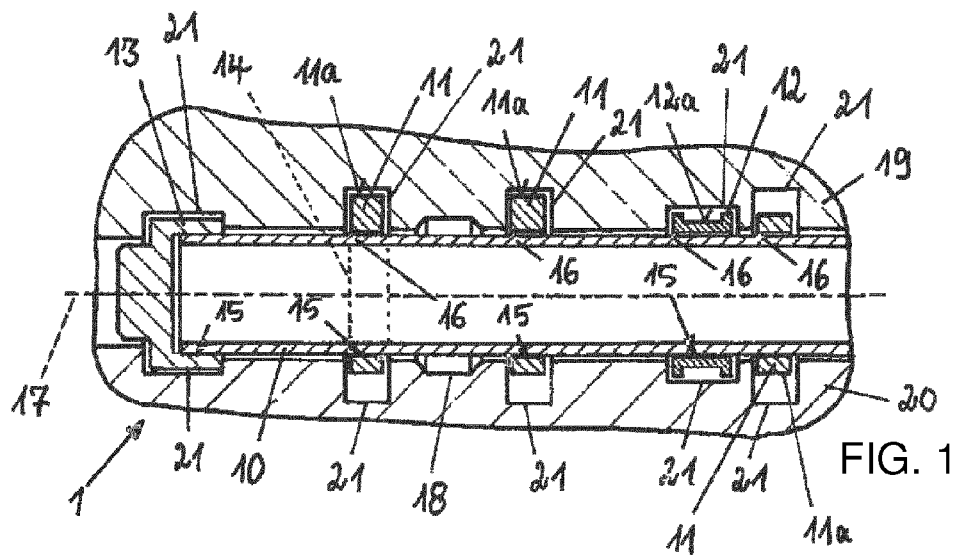
FIG. 1 a transversely sectioned view of the camshaft arranged in an internal high-pressure forming tool, FIG. 2 a perspective view of the camshaft with components partly arranged thereon an material mouldings in the surface of the support tube, FIG. 3a a cross-sectional view of an exemplary embodiment for arranging a component on the support tube with a first arrangement of a material moulding, FIG. 3b a cross-sectional view of an exemplary embodiment for arranging a component on the support tube with a second arrangement of a material moulding, FIG. 4 a cross-sectional view of the arrangement of the support tube and of a component in the internal high-pressure forming tool and FIG. 5 a transversely sectioned view of the arrangement of a component on the support tube following the carrying out of the internal high-pressure forming of the support tube.

FIG. 1 shows a camshaft 1 with a support tube 10, on which components 11, 12 and 13 are arranged. The components 11 are formed by cams 11, wherein a component 12 is formed as a bearing race 12 for mounting the camshaft 1. At the end side on the support tube 10 a component 13 is formed as an end piece 13, on which for example a drive pinion, a pulse generator cam, a camshaft adjuster or the like can be arranged.

The camshaft 1 is arranged in an internal high-pressure forming tool with a tool upper part 19 and a tool lower part 20, wherein the tool upper and lower parts 19 and 20 can be separated from one another and opened in a separation plane, wherein the separation plane runs in the longitudinal direction 17 of the support tube 10.

In the tool upper part 19 and in the tool lower part 20, recesses 21 are introduced and the components 11, 12 and 13 on the support tube 10 can be received in the recesses 21 when the camshaft 1 is placed in the tool upper part 19 and the tool lower part 20. Here, the recesses 21 are dimensioned larger in radial direction as well as in axial direction of the support tube 10 than the shell dimensions of the components 11, 12 and 13. Consequently, the internal high-pressure forming tool does not fulfil any positioning function of the components 11, 12 and 13 on the support tube 10 before or during the plastic deformation of the support tube 10 through the internal high-pressure forming takes place.

According to the invention, the support tube 10 comprises material mouldings 16, which are shown in the upper half section of the support tube 10 in the place of the respective seat position 14 for arranging the components 11, 12 and 13. The material moulding 16 is formed in the form of a locally limited material moulding on the support tube 10, and when the components 11, 12 and 13 are pushed onto the support tube 10, a holding effect of the respective component 11, 12 and 13 against the hole 15, which is introduced in the component 11, 12 and 13 and through which the support tube 10 extends, is achieved through the material moulding 16. In particular, the components 11, 12 and 13, prior to inserting the camshaft 1, can be brought into a final position on the support tube 10 and held in the position through the material mouldings 16 on the support tube 10. Consequently, the camshaft 1 can be placed in the internal high-pressure forming tool in a preassembled state, without a further positioning of the components 11, 12 and 13 being necessary during or after the internal high-pressure forming process.

The tool upper part 19 and the tool lower part 20 furthermore comprise a bearing position 18. When the support tube 10 is plastically expanded through internal high-pressure forming, the support tube 10 can be depicted in the bearing position 18 in the tool. Following this, the support tube 10 can be ground in the region of the bearing position 18 in order to create a mounting of the camshaft 1.

The cams 11 each have a function surface 11a and the bearing race 12 has a function surface 12a, which following the execution of the internal high-pressure forming can be finish-worked in a cutting process manner. Thus, the radial accuracy of the function surfaces 11a and 12a is achieved without a radial guiding of the components 11, 12 and 13 through the tool upper and lower parts 19 and 20 being required.

Figure 2:
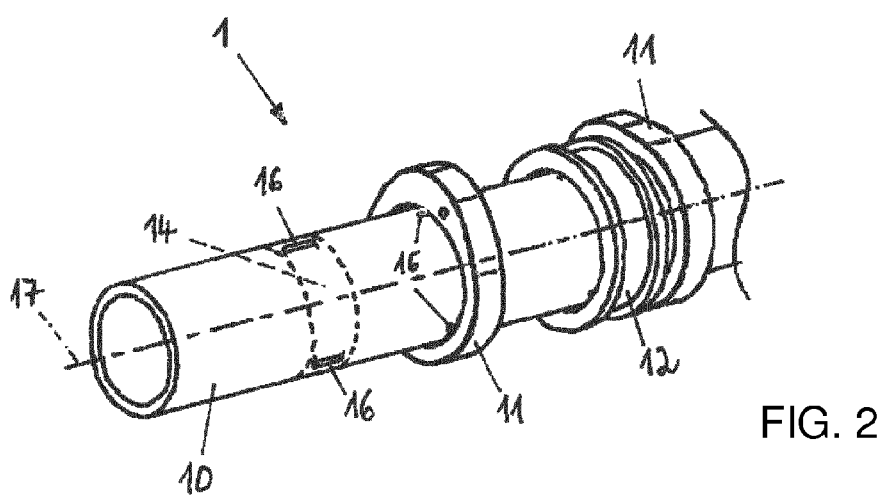

FIG. 2 shows a perspective view of an exemplary embodiment of the camshaft 1, and a support tube 10 is shown, which extend along the longitudinal direction 17. The support tube 10 comprises a plurality of seat positions 14 for arranging components 11 and 12, wherein one seat position 14 is shown unoccupied, and cams 11 and a bearing race 12 are arranged on further seat positions 14. Here it is noticeable that in the region of the seat position 14 material mouldings 16 are introduced, which are formed as elevations in the surface of the support tube 10. When a component 11 is arranged on the seat position 14, this can be fixed on the seat position 14 through the material mouldings 16, as is shown for example by the cam 11, below which two material mouldings 16 extend. The material mouldings 16 can for example be arranged distributed over the circumference of the seat position 14 in a division of 120°, and the component 11 is held through the material mouldings 16. Here, the outer diameter of the support tube 10 is smaller than the hole in the component 11, through which the support tube 10 extends. Only through the internal high-pressure forming is the support tube 10 plastically expanded in order to achieve the final interference fit assembly between the support tube 10 and the components 11, 12 and 13.

Figure 3A:
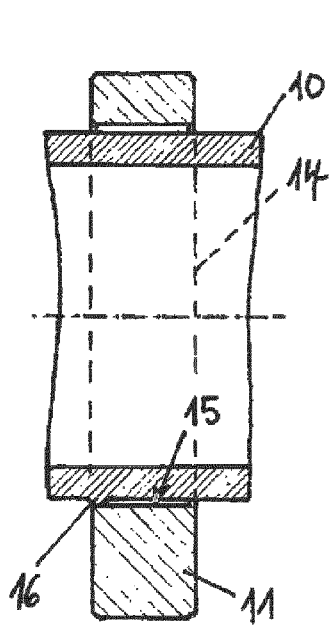

FIG. 3a shows a detail view of a cam 11 on the support tube 10, so that the support tube 10 extends through the hole 15 in the cam 11. Here it is noticeable that the outer diameter of the support tube 10 is smaller than the diameter of the whole 15 in the cam 11. This radial gap is locally bridged through a material moulding 16, which is introduced in the outer surface of the support tube 10. Exemplarily, merely one material moulding 16 is shown in the section of the representation, while a plurality of material mouldings 16 distributed over the circumference of the support tube can be provided. When the cam 11 is arranged on the indicated seat position 14 on the support tube 10, this takes place subject to elastic or preferentially slightly plastic deformation of the material moulding 16 or even of the inner surface of the hole 15 in the cam 11. A non-positive connection between the cam 11 and the support tube 10 is thereby created, through which the cam 11 is held on the support tube 10 in the seat position 14. The material moulding 16 is exemplarily shown on the edge of the cam 11 and thus on the edge of the seat position 14, while in the edge region located opposite a same number of material mouldings 16 can be provided.

Figure 3B:
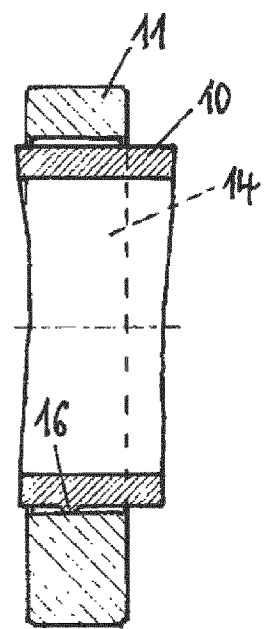

FIG. 3b shows a further arrangement of a cam 11 on a support tube 10 with a material moulding 16, which is formed approximately in the middle region of the seat position 14.

Figure 4:
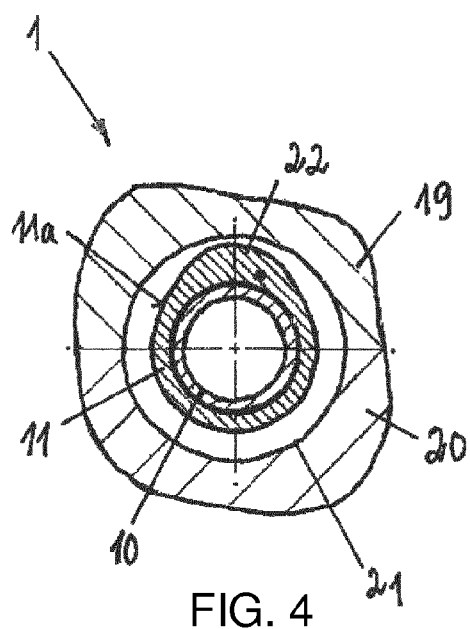

FIG. 4 shows a cross-sectional view of the camshaft 1 with a sectional plane, with respect to which the longitudinal direction 17 of the support tube 10 stands perpendicularly. The section runs in the region of a seat position, on which exemplarily a cam 11 with a cam crest 22 is arranged. Here, the camshaft 1 is located in an internal high-pressure forming tool with a tool upper part 19 and a tool lower part 20. The tool upper and lower parts 19 and 20 have a recess 21 with a diameter that is greater than the diameter of the cam 11. Thus, a radial guidance of the cam 11 in the tool 19, 20 is omitted so that during internal high-pressure forming the cam 11 remains freely moveable radially. Only following the internal high-pressure forming, if appropriate additionally after a thermal treatment of the components, can the function surface 11a of the cam 11 be finish-worked in a cutting process manner.

Figure 5:
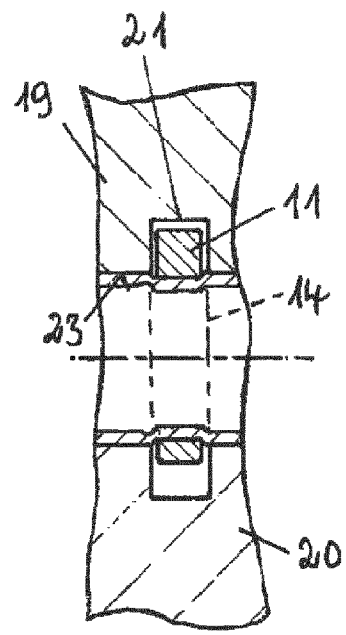

FIG. 5 finally shows a detail view of the arrangement of a cam 11 on a support tube 10, which was radially expanded through internal high-pressure forming. Through the radial expansion of the support tube 10 an interference fit assembly between the support tube 10 and the cam 11 is formed, which is arranged in the recess 21 in the tool upper part 19 and in the tool lower part 20. The region of the support tube 10 outside the seat position 14 comprises an expansion until the outer surface of the support tube 10 comes to lie against a tool inner surface 23. Thus, the support tube 10 has a greater diameter outside the seat positions 14 than in the region of the seat positions 14.

The invention in its embodiment is not restricted to the preferred exemplary embodiments stated above. Rather a number of versions is conceivable which makes use of the shown solution even with embodiments of a fundamentally different type. All features and/or advantages emanating from the claims, the description or the drawings including design details or spatial arrangements can be substantial to the invention both by themselves as well as in any combinations. The arrangement of the cam 11 described in the exemplary embodiment is presented exemplarily and the arrangement of the further components 12 and 13, for example of the bearing races 12 and end pieces 13 on the support tube 10 can be effected in the same way and with the same advantages as the cam 11.

A positive connection, also known as a form-locking connection, is one that connects two elements together due to the shape of the elements themselves, as opposed to a force-locking connection (e.g. a non-positive connection), which locks the elements together by force external to the elements. For example, a ball and socket make a form-locking connection due to the shapes of the ball and socket. Whereas a screw or nail defines a force locking connection.

LIST OF REFERENCE NUMBERS

1 Camshaft
10 Support tube
11 Component, cam
11a Function surface of the cam
12 Component, bearing race
12a Function surface of the bearing race
13 Component, end piece
14 Seat position
15 Hole
16 Material moulding
17 Longitudinal direction
18 Bearing position
19 Tool upper part
20 Tool lower part
21 Recess
22 Cam crest
23 Tool inner surface

The invention claimed is:

1. A camshaft, comprising:
   components including at least one cam and each having a hole formed therein;
   the components being placed on a support tube in a state as forged;
   the support tube defining predetermined seat positions and supporting said components including said at least one cam at said predetermined seat positions, said support tube at least partially extending through said hole in each of said components and an interference fit between said support tube and said components is formed by means of internal pressure forming, said hole of each of said components having a greater diameter than an outer diameter of said support tube;
   a plurality of locally formed material moldings disposed between said support tube and said hole of each of said components, through said plurality of locally formed material moldings said components are held in said predetermined seat positions in a desired orientation relative to said support tube such that said support tube with said components can be fed to the internal pressure forming, with said components assuming a definite position, said plurality of locally formed material moldings formed on at least one outer surface of said support tube at said predetermined seat positions of said support tube and extending in a longitudinal direction of said support tube;
   said plurality of locally formed material moldings embodied in an elongated manner extending in the longitudinal direction of said support tube with a length of each of said material moldings having one of the width of a component of said components or the width of a predetermined seat position of said predetermined seat positions;
   said support tube at each of said predetermined seat positions having exactly three of said plurality of locally formed material moldings, which are evenly distributed over a circumference of said support tube in an angle division of 120° to each other, and are introduced in said outer surface of said support tube;
   said plurality of locally formed material moldings having a cross-sectional shape consisting of a trapezium; and
   said plurality of locally formed material moldings having a height of 0.5 mm and are made by knurling.

2. A method for producing a camshaft having a support tube, on which at least one component including at least one cam, is disposed in a predetermined seat position, which comprises the steps of:
   providing the support tube and the at least one component, a hole being formed in the at least one component for disposing the at least one component on the support tube, the at least one component being disposed on the support tube in a state as forged;

forming exactly three locally formed material moldings on an outer surface of the support tube at the predetermined seat position through a knurling method, the three locally formed material moldings embodied in an elongated manner extending in a longitudinal direction of the support tube with a length of each of said material moldings having one of the width of the at least one component or the width of the predetermined seat position, and said three locally formed material moldings having a height of approximately 0.5 mm and a cross-sectional shape consisting of a trapezium, the three locally formed material moldings being evenly distributed over a circumference of the support tube in an angle division of 120° to each other, and are introduced in the outer surface of said support tube;

rotationally fixed prepositioning the at least one component in the predetermined seat position by forming at least a non-positive connection of the at least one component with the support tube in a region of a material molding of said three locally formed material moldings with the at least one component assuming a definite position on the support tube, wherein the support tube at least partially extends through the hole in the at least one component, wherein the material molding is introduced in the hole; and creating an interference fit assembly between the support tube and the at least one component by means of internal pressure forming subject to forming a required connection strength between the at least one component and the support tube.

3. The method according to claim 2, wherein the internal pressure forming further creates at least one bearing position on the support tube through plastic forming.

4. The method according to claim 2, wherein, following the creation of the interference fit assembly, the at least one component is finish-worked through a cutting process method.

5. A method for producing a camshaft having a support tube, on which at least one component including at least one cam, is disposed in a predetermined seat position, which comprises the steps of:

providing the support tube and the at least one component, a hole being formed in the at least one component for disposing the at least one component on the support tube;

disposing the at least one component on the support tube in a state as forged;

forming exactly three locally formed material moldings on an outer surface of the support tube at the predetermined seat position, the three locally formed material moldings embodied in an elongated manner extending in a longitudinal direction of the support tube with a length of each of said material moldings having one of the width of the at least one component or the width of the predetermined seat position, and said three locally formed material moldings having a height of approximately 0.5 mm and a cross-sectional shape consisting of a trapezium, the three locally formed material moldings being evenly distributed over a circumference of the support tube in an angle division of 120° to each other, and are introduced in the outer surface of said support tube;

rotationally fixed prepositioning the at least one component in the predetermined seat position by forming at least a non-positive connection of the at least one component with the support tube in a region of a material molding of said three locally formed material moldings; and creating an interference fit assembly between the support tube and the at least one component by means of internal pressure forming subject to forming a required connection strength between the at least one component and the support tube.

6. The method according to claim 5, wherein the support tube at least partially extends through the hole in the at least one component, and the material molding is introduced in the hole.

7. The method according to claim 5, which further comprises introducing the material molding in at least one of the outer surface of the support tube or in the hole through a knurling method.

8. The method according to claim 5, wherein the internal pressure forming further creates at least one bearing position on the support tube through plastic forming.

9. The method according to claim 5, wherein the interference fit assembly is created through a cutting process method that is finish-worked.

* * * * *